Patented Feb. 7, 1950

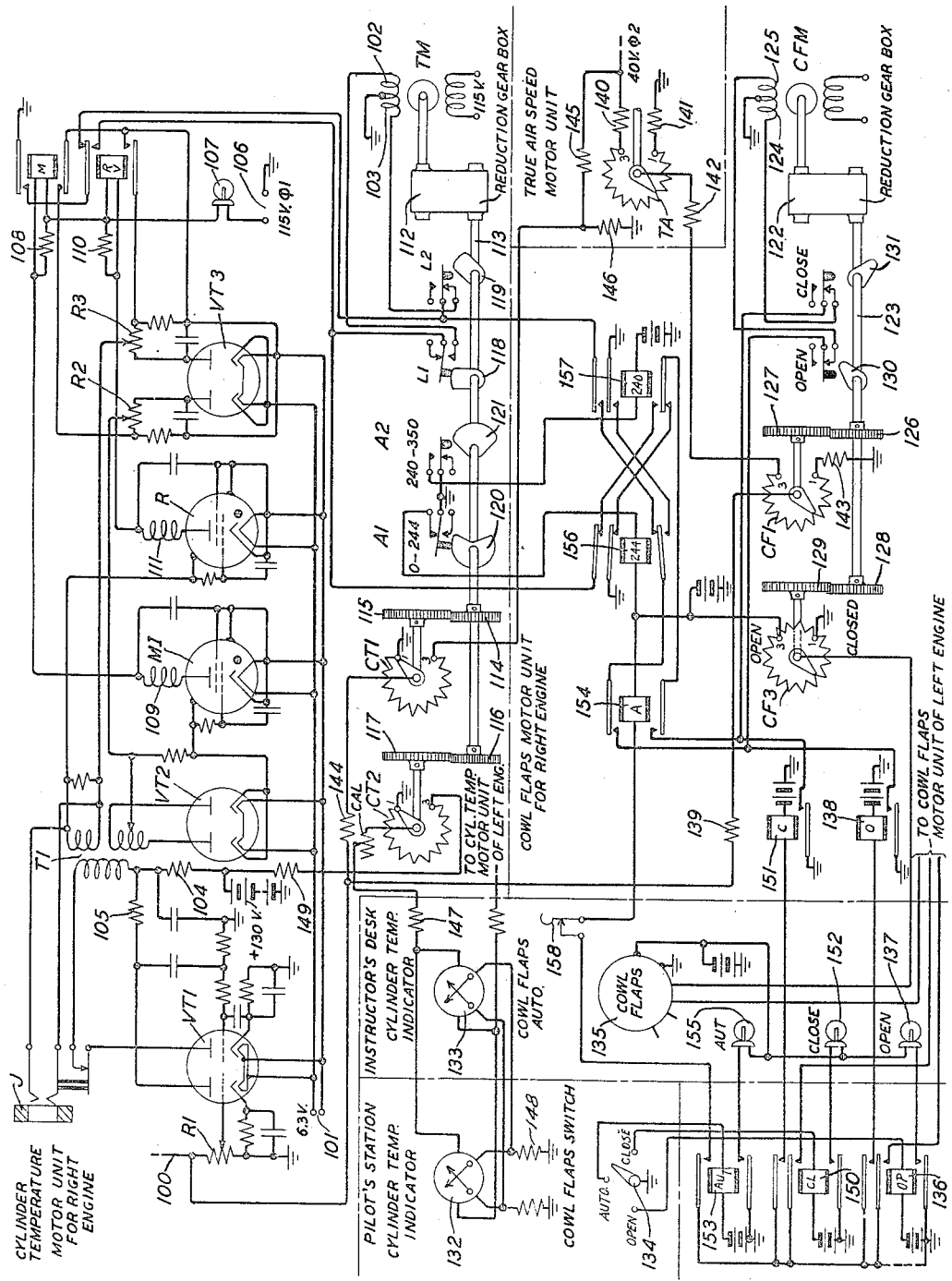

2,496,617

UNITED STATES PATENT OFFICE 2,496,617

ENGINE TEMPERATURE AND COWL FLAP CONTROL FOR AIRCRAFT GROUND TRAINERS

Frederick M. Burelbach, Cranford, N. J., assignor to Bell Telephone Laboratories, Incorporated, New York, N. Y., a corporation of New York Application December 28, 1946, Serial No. 719,091

8 Claims. (Cl. 35—13)

1

This invention relates to ground trainers for aircraft and more particularly to circuits for simulating the automatic temperature control of the engine cowl flaps.

In certain types of airplanes, provision is made to automatically control the engine cowl flaps of the engine so that such engine may operate at the temperature which will be conducive to its most efficient operation. The engine cowl flaps are arranged to be controlled manually by the pilot but he may at any time enable them to be controlled automatically in accordance with the rise or fall of the cylinder temperature of the engine. Should the cowl flaps be open when the control is switched to automatic operation, and the engine cylinder temperature should fall below a specified amount, for example 240° C., or a temperature below the most efficient operating temperature, the cowl flaps will automatically close and remain closed until the engine cylinder temperature rises to some value above 240° C. when the cowl flaps will automatically open.

It is therefore the object of the present invention to provide in an airplane trainer, apparatus which simulates the automatic regulation of the engine cylinder temperature by controlling the amount of the opening of the engine cowl flaps.

To attain this object in a trainer, the control of the engine cowl flaps by the operation of the cowl flaps control switch by the pilot, is simulated by a cowl flaps motor unit, the shaft of which is driven by a reversible motor to positions representative of the open and closed positions of engine cowl flaps. The position to which the shaft is rotated is communicated telemetrically to an indicator at an instructor's desk which indicates the position to which the pilot has operated the engine cowl flaps.

Provision is also made for simulating the automatic control of the engine cowl flaps when the pilot operates his control switch to the automatic position. As previously stated, in the airplane when the cowl flaps are placed by the pilot under automatic control, they are opened or closed in accordance with the rise or fall of the engine cylinder temperature. In the trainer a motor unit is provided which is controlled to rotate its shaft into a position representative of the assumed engine cylinder temperature. This shaft is provided with cams which control switches, one of which causes the opening of a circuit of a first relay when the shaft rotates to a position representative of a temperature greater than 244° C. and the other of which cams closes the circuit of

2 a second relay when the shaft rotates to a position representative of a temperature greater than 240° C. These relays cooperate, if the pilot has operated the cowl flaps control switch to its automatic position, to control the cowl flaps motor unit to operate to a position representative of a closed cowl flaps condition if at the time it is in a position representative of an open cowl flaps position and the relays are operated to positions representative of a decrease in engine cylinder temperature below 240° C. or, to thereafter operate to a position representative of an open cowl flaps condition if the relays are operated to positions representative of an increase in engine cylinder temperature above 244° C.

Since, with the cowl flaps open the cooling effect will be greater, the greater the true air speed of the flight becomes, the position to which the engine cylinder motor unit rotates its shaft is made dependent in the trainer not only upon the assumed amount of cowl flaps opening as determined by a potentiometer driven from the shaft of the cowl flaps motor unit but also upon the position of the slider of a potentiometer which is driven to a position representative of the true air speed of the simulated flight.

For a clearer understanding of the invention and the mode of its operation, reference may be had to the following detailed description thereof when read in connection with the single sheet of drawing.

The cylinder temperature motor unit, disclosed in the upper portion of the drawing, is of the type fully disclosed in Patent No. 2,428,767 granted to Albert, Davis, Gumley, and Holden, October 14, 1947. The motor unit comprises a first dual vacuum tube VT1 which serves as a two-stage resistance coupled amplifier to amplify the control signal applied to the control grid of the first unit from the slider of the gain control rheostat R1 which is connected to the input signal conductor 100, and to apply the amplified signal potential to the primary winding of the step-up transformer T1. The amplified signal is impressed from the lower secondary winding of the transformer through the dual diode tube VT2, serving as a full wave rectifier, upon the control grid of the thyratron tube M1. The signal is also impressed from the upper secondary winding of the transformer upon the control grid of the thyratron tube R. Grid biases are applied to the control grids of the tubes M1 and R from the source 101 of filament heating current 101 through the dual diode tube VT3 and are adjusted by the grid biasing rheostats R2 and R3.

Tube M1, upon firing, causes the operation of motor control relay M which is effective to short circuit one or the other of the shaded pole windings 102 or 103 of the motor TM dependent upon whether the reversing relay RV is operated or unoperated. Tube R upon operating causes the operation of reversing relay RV. The main field winding of motor TM is energized from a source of 115 volt alternating current. When the shaded pole winding 102 is short circuited and the main field winding is energized, the motor TM rotates in one direction and when the shaded pole winding 103 is short circuited and the main field winding is energized, the motor rotates in the opposite direction.

Cathode heater current is supplied to the filaments of all of the tubes from the source 101. Anode potential is supplied to the anode of the left unit of tube VT1 from the +130 volt source of direct current, through resistors 104 and 105, and to the anode of the right unit of tube VT1 through resistor 104, the primary winding of transformer T1 and normal contacts of the test jack J. Anode potential is supplied to the anode of tube M1 from the 115 volt source of potential 106, through ballast resistance lamp 107, the winding of relay M in parallel with resistor 108 and through choke coil 109 and to the anode tube R from the same source, through lamp resistance 107, through the winding of relay RV in parallel with resistor 110 and through the choke coil 111.

The motor TM, through the reduction gear box 112, drives the shaft 113 in one or the other direction dependent upon the operated or unoperated condition of the reversing relay RV, at a slow speed and, through pairs of gears such as 114, 115 and 116, 117, drives the sliders of potentiometers CT1 and CT2. Shaft 113 also has secured thereto, cams 118 and 119 which control the contacts of the L1 and L2 limit switches to cause the rotation of the motor TM to cease when the sliders of the potentiometers approach the Nos. 1 and 3 winding terminals, respectively. The shaft 113 also has secured thereto cams 120 and 121 which control the contacts of the A1 and A2 switches, respectively, cam 120 being so shaped that the contacts of switch A1 are held in the operated position disclosed until the shaft 113 has been rotated to a position representative of an increase in engine cylinder temperature above 244° C. and cam 121 being so shaped that the contacts of switch A2 are not operated to their alternate position until the shaft 113 has rotated to a position representative of an increase in engine temperature above 240° C.

The true air speed motor unit disclosed schematically in the right portion of the drawing is of the same general type as the cylinder temperature motor unit but to simplify the drawing only that one of the potentiometers driven thereby which enters into the operation of the circuits under consideration has been disclosed.

The cowl flaps motor unit disclosed in the lower portion of the drawing, comprises a reversible shaped pole motor CFM which, through the reduction gear box 122, rotates the shaft 123 in one direction or the other at a slow speed dependent upon which of the shaded pole windings 124 or 125 of the motor is short circuited. The shaft 123 through the gears 126, 127 and 128, 129, drive the sliders of potentiometers CF1 and CF3 and rotates cams 130 and 131 which control the limit switches Open and Close, respectively.

The right units of the cylinder temperature indicators 132 and 133 at the pilot's station in the trainer and at the instructor's desk are controlled by the potentiometer CT2 of the cylinder temperature motor unit for the simulated right engine of the trainer. If the trainer, as assumed, is arranged to simulate a two-engined airplane, a second cylinder temperature motor unit and a corresponding cowl flaps motor unit would be provided for the second simulated engine and the left units of the dual indicators 132 and 133 would be controlled by a potentiometer of the second cylinder temperature motor unit corresponding to potentiometer CT2.

A cowl flaps control switch is provided at the pilot's station for each of the assumed engines, the switch for controlling the cowl flaps of the right engine being shown at 134. At the instructor's desk a dual indicator 135 is provided, one unit of which is controlled by the potentiometer CF3 of the cowl flaps motor unit for the right engine and the other unit of which is controlled by a similar potentiometer driven by the cowl flaps motor unit for the left engine (not shown). The instructor is also provided with keys by means of which he may at will disable the automatic operation of the engine cowl flaps motor units in simulation of the failure of the equivalent apparatus of an airplane. Key 153 for the engine cowl flaps motor unit for the right engine is disclosed.

It will be assumed that to prepare the trainer for operation, the starting of both engines is simulated and that as a result of the starting of the right engine, potential of phase $\phi 1$ is applied to signal input conductor 100 of the cylinder temperature motor unit for the right engine representative of the increase of cylinder temperature due to the engine operation. It will also be assumed that the pilot has operated the cowl flaps switches to their Open positions. With the control switch 134 in its Open position, an obvious circuit is established for the OP relay 136 which operates and closes a circuit for lighting the Open lamp 137 at the instructor's desk and closes an obvious circuit for the O relay 138 of the cowl flaps motor unit for the right engine. With relay 138 operated, a short circuit is established for the right hand shaded pole winding 125 of the motor CFM extending from ground, over the contacts of relay 138, over the contacts of limit switch Open and the winding 125 to ground. With the main stator winding of the motor energized from a source of 115-volt alternating current, the motor CFM is operated in a direction to drive the sliders of potentiometers CF1 and CF3 toward the No. 3 terminals of their windings. When the sliders approach such terminals cam 130 operates switch Open to its alternate position thereby opening the short circuit of the shaded pole winding 125 to stop the motor. The movement of the slider of potentiometer CF3 controls the indicator 135 at the instructor's desk to show that the cowl flaps for the right engine have been fully opened. Similarly, the cowl flaps motor unit for the left engine is controlled to similarly control the other unit of indicator 135.

With the slider of potentiometer CF1 at the No. 3 terminal of its winding, potential of phase $\phi 2$ is applied through resistor 139 to signal input conductor 100 of the cylinder temperature motor unit for the right engine. This potential is also a function of the true air speed. To derive this potential, potential of phase φ2 is applied through resistor 140, through the winding of the true air speed potentiometer TA and through resistor 141 to ground, but with no air speed assumed at the time, the slider of this potentiometer will be at the No. 1 terminal of its winding and therefore the minimum value of phase φ2 potential will be derived at such slider and applied through resistor 142, through the winding of cowl flaps potentiometer CF1 and resistor 143 to ground. Phase φ2 potential will therefore be derived at the slider of potentiometer CF1 and applied as described through resistor 139 to signal input conductor 100. It will be noted that with the potentiometers TA and CF1 connected as described, the phase φ2 potential, representative of the lowering of the cylinder temperature, will increase as the air speed increases and as the cowl flaps open.

The summation of the potentials applied to conductor 100 is amplified by the two units of amplifier tube VT1 and is applied to the input transformer T1. Through the response of tubes VT1 and VT2, VT3 and M1 of the cylinder temperature motor control unit, the M relay is caused to operate and with tube R not firing in response to the predominating phase φ1 signal, and consequently relay RV not operated, a short circuit is established from ground over the upper contacts of relay M, over the upper back contact of relay RV, over the normal contacts of the L2 limit switch and through the left shaded pole winding 103 of motor TM to ground. Motor TM is thereby caused to rotate shaft 113 at a slow speed in a direction representative of an increase in temperature. The sliders of potentiometers CT1 and CT2 are now rotated towards the No. 3 terminals of their windings. As the slider of balancing potentiometer CT1 advances, potential of phase φ2 in increasing value is applied through resistor 144 to the signal input conductor 100 until, when such potential balances the signal potential of phase φ1 applied to such conductor, no signal potential is applied to the control grid of the left unit of amplifier tube VT1 and relay M therefore releases and the motor TM comes to rest. For deriving the phase φ2 potential at the slider of potentiometer CT1, the potentiometer winding is energized over a circuit extending from the junction point between resistors 145 and 146 of the potential divider connected between the 402 bus bar and ground. In response to the adjustment of the slider of potentiometer CT2, a circuit is established from the slider of such potentiometer, through the calibrating rheostat CAL, through resistor 147 and thence in parallel through the right units of the cylinder temperature indicators 132 and 133 at the pilot's station and at the instructor's desk, respectively, and thence through resistor 148 to ground. The winding of potentiometer CT2 is energized by direct current from the +130 volt direct current source through resistor 149 and thence through the potentiometer winding to ground. The indicators will thus be set into positions representative of the increase in cylinder temperature of the right engine. The indicators will show a gradual increase in reading from about 15° C. to about 150° C. after an interval of about three minutes.

The pilot may simulate the closing of the cowl flaps of the right engine by operating the control switch 134 to its Close position thereby causing the operation of the CL relay 150 which in turn establishes an obvious operating circuit for the C relay 151 of the cowl flaps motor unit for the right engine. The fact that the pilot has so operated the switch 134 is indicated to the instructor by the lighting of the Close lamp 152 under the control of relay 150. With the C relay 151 operated a circuit is established from ground over its contacts, over the contacts of the Close limit switch and through the left shaded pole winding 124 of the motor CFM to ground thereby short-circuiting such winding to cause the motor to turn in a direction representative of the closing of the cowl flaps. When the sliders of potentiometers CF1 and CF2 approach the No. 1 terminals of their windings, representative of the closed position of the cowl flaps, the cam 131 will operate the limit switch Close to its alternate position thereby opening the short circuit of winding 124 to cause the motor to come to rest.

The movement of the slider of potentiometer CF3 controls the right unit of the control flaps indicator 135 at the instructor's desk to indicate that the cowl flaps of the right engine are closed. The movement of the slider of the potentiometer CF1 decreases the phase φ2 potential applied to signal input conductor 100 of the cylinder temperature motor unit for the right engine whereupon the motor TM of such unit rotates the shaft 113 in a direction representative of an increase in cylinder temperature. Through the movement of the slider of potentiometer CT1 toward the No. 3 terminal of its winding, the phase φ2 balancing potential applied therefrom to signal input conductor 100 is increased until a potential balance on conductor 100 is again attained. Through the movement of the slider of potentiometer CT2 the right units of the cylinder temperature indicators 132 and 133 at the pilot's station and instructor's desk, respectively, are controlled to show an increase in their readings which will result from the closure of the engine cowl flaps for the right engine.

It will now be assumed that the cowl flaps of both engines are open and that a cruising condition of flight is being simulated. The increase in brake horsepower output of the engine during take-off and climbing will cause an increase in the phase φ1 potential applied to the signal input conductor 100 of the cylinder temperature motor unit for the right engine and a consequent increase in the temperature indicated by the indicators 132 and 133, for example, to a value over 240° C., but when the brake horsepower is reduced for cruising and the phase φ1 potential applied to the signal input conductor is thereby reduced, the readings of the indicators will decrease. Also due to the simulated movement of the trainer and the consequent cooling effect of the air current passing through the open cowl flaps, the temperature readings will further decrease. This is simulated in the trainer by the increase in phase φ2 potential applied to the signal input conductor 100 by the movement of the slider of the true air speed potentiometer TA as the air speed increases. The increase in phase φ2 potential applied to conductor 100 causes the motor TM of the cylinder temperature motor unit for the right engine to run in a direction representative of a decrease in temperature and will be indicated by the right units of indicators 132 and 133.

It will now be assumed that the pilot operates the cowl flaps control switches such as 134 for both engines to their Auto positions. The movement of switch 134 establishes an obvious circuit for the AUT relay 153 which in turn establishes the circuit of the A relay 154 of the cowl flap motor unit for the right engine and establishes the circuit for the AUT lamp 155 at the instructor's desk to inform the instructor that the control switch has been operated to the position for automatic operation of the cowl flaps of the right engine.

It will now be assumed that the cylinder temperature for the right engine decreases to a value below 240° C. Under this condition the switches A1 and A2 will be operated by cams 120 and 121 to the positions indicated in which the relay 156 will be maintained operated and the relay 157 will be released. With the A relay 154 operated, a circuit will now be established from ground over the inner upper contacts of relay 156, over the lower back contact of relay 157, over the lower contacts of relay 154, over the contacts of the Close limit switch and through the left shaded pole winding 124 of the motor CFM to ground. The motor CFM will thereupon operate in a direction representative of the closing of the cowl flaps whereupon the indicator 135 will show a closing movement of the cowl flaps for the right engine and the potentiometer CF1 will decrease the $\varphi 2$ potential applied from its slider to signal input conductor 100 of the cylinder temperature motor unit for the right engine.

As previously described the reduction of the value of the phase $\varphi 2$ potential will result in the operation of the motor TM of the cylinder temperature motor unit in a direction representative of an increase in cylinder temperature. If the temperature continues to increase until it reaches 240° C., the cam 121 will operate the switch A2 to its alternate position thereby closing an obvious circuit for the relay 157. Until the temperature rises above 244° C. the cam 120 will maintain the switch A1 operated to its alternate position and relay 156 will be maintained operated. With the motor TM of the cylinder temperature motor unit still operating under the control of relay M, a circuit will now be effective from ground over the upper contacts of relay M, over the upper back contact of relay RV, over the upper contacts of relay 157, over the lower front contact of relay 156, over the upper contacts of relay 154, over the contacts of the limit switch Open and through the right shaded pole winding 125 of motor CFM to ground. Motor CFM will thereupon operate in a direction representative of the opening of the cowl flaps whereupon the indicator 135 will show an opening movement of the cowl flaps for the right engine and the potentiometer CF1 will increase the phase $\varphi 2$ potential applied from the slider of such potentiometer to signal input conductor 100 of the cylinder temperature motor unit for the right engine, representative of the cooling effect of the opening of the cowl flaps. When this effect is sufficient to prevent any further increase in temperature, relay M of the temperature motor unit will release thereby stopping the motor TM of the temperature motor unit and the motor CFM of the cowl flaps motor unit.

If the engine temperature should start to increase again and the motor TM of the cylinder temperature motor unit should be started again through the operation of relay M, the short-circuit of the left shaded pole winding of the motor CFM of the cowl flaps motor unit will be again established as previously described whereupon the motor CFM will operate in a direction representative of a further opening of the cowl flaps. Thereby an increased potential of phase $\varphi 2$ will be applied from the slider of potentiometer CF1 to the signal input conductor 100 with the result that the motor TM will be brought to rest and the motor CFM will also stop.

Should the shaft 113 of the cylinder temperature motor unit be rotated to a position representative of a temperature greater than 244° C., then cam 120 will release the contacts of switch A1 to their alternate position. At this time cam 121 will have operated the contacts of switch A2 to their alternate position and a circuit will be effective from ground over the inner upper contacts of relay 157, over the lower back contact of relay 156, over the upper contacts of relay 154, over the contacts of the limit switch Open, and through the right shaded pole winding 125 of the motor CFM to ground. Motor CFM will thereupon rotate shaft 123 in a direction representative of the further opening of the cowl flaps until, when a position representative of the full open condition of the flaps is reached, limit switch Open will be operated and the motor CFM will come to rest.

If the indicated temperature is between 240° and 244° C. and the cowl flaps are fully opened as described and the temperature decreases due to the application of increased phase $\varphi 2$ potential from the slider of potentiometer CF1 to signal input conductor 100, the motor TM will then, through the operation of relays M and RV, be operated to drive the shaft 113 in a direction representative of a decrease in temperature. Under this condition a circuit is established from ground over the upper contacts of relay M, over the upper front contact of relay RV, over the upper contacts of relay 156 now operated due to the closure of the switch A1 by cam 120, over the lower front contact of relay 157 which is now operated due to the closure of switch A2 by cam 121, over the lower contacts of relay 156, over the contacts of limit switch Close and thence through the left shaded pole winding 124 of motor CFM of the cowl flaps motor unit to ground whereupon such motor will drive the shaft 123 in a direction representative of a closing of the cowl flaps. This reduces the cooling effect as represented by a reduction of the phase $\varphi 2$ potential supplied from the slider of the potentiometer CF1 to signal input conductor 100 and consequently, the motor TM is brought to a stop through the release of relays M and RV and the operation of motor CFM is arrested. This may occur before the shaft 123 has been rotated to a position representative of a fully closed position of the cowl flaps.

Should the cooling effect cause the motor TM to drive the shaft 113 to a position representative of a temperature below 240° C., the cam 121 will release switch A2 and thereby release relay 157, but relay 156 will be maintained operated. A circuit will then be closed from ground over the inner upper contacts of relay 156, over the lower back contact of relay 157, over the lower contacts of relay 154, over the contacts of the limit switch Close and through the left shaded pole winding 124 of motor CFM to ground, whereupon the motor will continue operating until the shaft 123 reaches a position representative of a fully closed position of the cowl flaps at which time cam 131 will open the contacts of the limit switch Close to stop the motor.

The over-all result of the operation of the circuit is that with the cowl flaps control switch 134 in its Auto position, when the indicated cylinder temperature is below 240° C. the cowl flaps will be fully closed and when the temperature is above 244° the cowl flaps will be fully opened. In the temperature range between 240° and 244° the cowl flaps opening will be sufficient to prevent any change in temperature. The values of 240° and 244° have been arbitrarily selected and may be changed by the cuttings of the cams 120 and 121.

In the foregoing description, only the automatic and manual control of the cowl flaps for the right engine have been described, but it is to be understood that in a trainer designed to simulate the operation of a plurality of engines, apparatus similar to that disclosed would be operated in a similar manner for each of the other simulated engines.

What is claimed is:

1. In an aircraft trainer wherein the operation of an airplane engine is simulated, a motor, means operable by said motor to positions representative of the positions of engine cowl flaps, means for simulating the change in engine cylinder temperature incident to the engine operation, means operated when the simulated temperature falls below a predetermined value to cause said motor to operate said first means to a position representative of a fully closed position of the cowl flaps and means operated by said first means to control said engine cylinder temperature simulating means in a manner representative of an increase in temperature incident to the closing of the engine cowl flaps.

2. In an aircraft trainer wherein the operation of an airplane engine is simulated, a motor, means operable by said motor to positions representative of the positions of engine cowl flaps, means for simulating the change in engine cylinder temperature incident to the engine operation, means operated when the simulated temperature falls below a predetermined value to cause said motor to operate said first means to a position representative of the fully closed position of the cowl flaps, means operated by said first means to control said engine cylinder temperature simulating means in a manner representative of an increase in temperature incident to the closing of the engine cowl flaps, and means operative when the simulated temperature rises above a predetermined value to cause said motor to operate said first means to a position representative of the opening of the engine cowl flaps.

3. In an aircraft trainer wherein the operation of an airplane engine is simulated, a motor, means operable by said motor to positions representative of the positions of engine cowl flaps, means for simulating the change in engine cylinder temperature incident to the engine operation, means operated when the simulated temperature falls below a predetermined value to cause said motor to operate said first means to a position representative of a fully closed position of the cowl flaps, means operative when the simulated temperature rises above a predetermined value to cause said motor to operate said first means to a position representative of the opening of the engine cowl flaps, and means controlled by said first means to control said temperature simulating means to maintain the simulated temperature between said predetermined low and high values.

4. In an aircraft trainer wherein the operation of an airplane engine is simulated, a first motor, means operable by said motor to positions representative of the positions of engine cowl flaps, a second motor, means operable by said second motor to positions representative of the assumed cylinder temperature of an engine incident to the engine operation, means operable in response to the operation of said second motor when the simulated temperature rises above a predetermined value to cause said first motor to operate said first means in a manner representative of the opening of the cowl flaps, means controlled by said first means to cause said second motor to gradually come to rest when said first means has operated to a position representative of an opening of the engine cowl flaps to a degree sufficient to arrest the rise in cylinder temperature, and means effective upon the arresting of the operation of said second motor to arrest the operation of said first motor.

5. In an aircraft trainer wherein the operation of an airplane engine is simulated, a first motor, means operable by said motor to positions representative of the positions of engine cowl flaps, a second motor, a shaft rotatable by said second motor to positions representative of the assumed cylinder temperature of an engine incident to the engine operation, a cam operated switch operable by said shaft when said shaft is rotated to a position representative of a cylinder temperature above a predetermined value, a relay operable upon the closure of said switch for causing said first motor to operate said first means in a manner representative of the opening of the engine cowl flaps, means controlled by said first means to cause said second motor to gradually bring said shaft to rest when said first means has operated to a position representative of an opening of the engine cowl flaps to a degree sufficient to arrest the rise in temperature, and means effective upon the arresting of the operation of said second motor to arrest the operation of said first motor.

6. In an aircraft trainer wherein the operation of an airplane engine is simulated, a first motor, means operable by said motor to positions representative of the positions of engine cowl flaps, a second motor, a shaft rotatable by said second motor to positions representative of the assumed cylinder temperature of an engine incident to the engine operation, a first cam operated switch operable by said shaft when said shaft is rotated to a position representative of a cylinder temperature above a predetermined value, a relay operable upon the closure of said switch for controlling said first motor to operate said first means in a manner representative of the opening of the engine cowl flaps, means controlled by said first means to cause said second motor to slow down the rotation of said shaft representative of the cooling effect due to the opening of the engine cowl flaps, a second cam operated switch opened by said shaft when said shaft rotates to a position representative of a rise in cylinder temperature above a predetermined value, and a normally operated relay releasable upon the opening of said latter switch for causing said first motor to operate said first means to a position representative of a fully opened condition of said engine cowl flaps.

7. In an aircraft trainer wherein the operation of an airplane engine is simulated, a first motor, means operable by said motor to positions representative of the positions of engine cowl flaps, a second motor, a shaft rotatable by said second motor to positions representative of the assumed cylinder temperature of an engine incident to the engine operation, a cam operated switch operable by said shaft when said shaft is rotated to a position representative of a cylinder temperature above a predetermined value, a normally operated relay releasable upon the operation of said switch for controlling said first motor to operate said first means in a manner representative of the closing of the engine cowl flaps, means controlled by said first means to cause said second motor to gradually bring said shaft to rest when said first means has operated to a position representative of a closing of the engine cowl flaps to a degree sufficient to arrest the drop in cylinder temperature, and means effective upon the arresting of the operation of said second motor to arrest the operation of said first motor.

8. In an aircraft trainer wherein the operation of an airplane engine is simulated, a first motor, means operated by said motor to positions representative of the positions of engine cowl flaps, a second motor, a shaft rotatable by said second motor to positions representative of the assumed cylinder temperature of an engine incident to the engine operation, a first cam operated switch operable by said shaft when such shaft is rotated to a position representative of a cylinder temperature below a predetermined value, a relay operable upon the opening of said switch for controlling said first motor to operate said first means in a manner representative of the closing of the engine cowl flaps, means controlled by said first means to cause said second motor to slow down the rotation of said shaft representative of the heating effect due to the closing of the engine cowl flaps, a second cam operated switch opened by said shaft when said shaft rotates to a position representative of a decrease in cylinder temperature below a predetermined value, and a relay releasable upon the opening of said latter switch for causing said first motor to operate said first means to a position representative of a fully closed condition of said engine cowl flaps.

FREDERICK M. BURELBACH.

REFERENCES CITED

The following references are of record in the file of this patent:

UNITED STATES PATENTS

| Number | Name | Date |
| --- | --- | --- |
| 2,372,741 | Horsfield | Apr. 3, 1945 |
| 2,428,67 | Albert | Oct. 14, 1947 |